US012736164B2

(12) United States Patent
Chang et al.

(10) Patent No.: US 12,736,164 B2
(45) Date of Patent: Sep. 15, 2026

(54) QUICK CONNECTOR

(71) Applicant: JPC connectivity Inc., New Taipei City (TW)

(72) Inventors: Hsu-Feng Chang, New Taipei City (TW); Yu Chai Yeh, New Taipei City (TW)

(73) Assignee: JPC CONNECTIVITY INC., New Taipei City (TW)

( * ) Notice: Subject to any disclaimer, the term of this patent is extended or adjusted under 35 U.S.C. 154(b) by 0 days.

(21) Appl. No.: 19/379,800

(22) Filed: Nov. 5, 2025

(65) Prior Publication Data

US 2026/0139777 A1 May 21, 2026

(30) Foreign Application Priority Data

Nov. 15, 2024 (TW) ................................ 113144106

(51) Int. Cl.
*F16L 37/36* (2006.01)
*F16L 37/34* (2006.01)

(52) U.S. Cl.
CPC ............... *F16L 37/36* (2013.01); *F16L 37/34* (2013.01)

(58) Field of Classification Search
CPC ......... F16L 37/34; F16L 37/36; F16L 37/367; F16L 29/04
See application file for complete search history.

(56) References Cited

U.S. PATENT DOCUMENTS

| | | | | |
|---|---|---|---|---|
| 12,085,206 | B2 | 9/2024 | Gallou | |
| 2005/0046178 | A1* | 3/2005 | Sato | F16L 37/34 |
| 2009/0322076 | A1* | 12/2009 | Tiberghien | F16L 37/34 |
| 2015/0001844 | A1* | 1/2015 | Tiberghien | F16L 37/36 |
| 2018/0003324 | A1* | 1/2018 | Dinh | F16L 37/34 |

FOREIGN PATENT DOCUMENTS

| | | |
|---|---|---|
| CN | 110397813 A | 11/2019 |
| TW | M667758 U | 3/2025 |

* cited by examiner

*Primary Examiner* — Zachary T Dragicevich
(74) *Attorney, Agent, or Firm* — WPAT, PC

(57) ABSTRACT

A quick connector for transporting a liquid comprises a female connector. The female connector comprises a front housing, a piston cover, a piston structure and a first spring. The piston cover is disposed in the first space of the front housing, and the outer surface of the piston cover has a plurality of slide blocks to be respectively disposed within the slide rails for allowing the piston cover to slide within the first space, the piston structure comprises a piston base, a piston rod, and a piston head connected in sequence. The piston base is disposed at the opening of the first space within the front housing through the locking grooves. The piston head is disposed in the through hole of the piston cover. The first spring is disposed in the first space and its two ends respectively abutting against the piston cover and the piston base.

10 Claims, 10 Drawing Sheets

QUICK CONNECTOR

BACKGROUND OF THE INVENTION

1. Field of the Invention

The present invention relates to a quick connector, and more particularly, to a quick connector with a piston cover and slide rails that can be applied to liquid cooling.

2. Description of the Prior Art

Recently, with the development of technology, the demand for server has been continuously increasing. Servers can generate heat during computation; therefore, it is necessary to arrange a heat dissipation device on the upper side of the heat generation region within the chip to prevent the chip or the electronic components from burning out. However, air-cooling systems in the prior art cannot satisfy the heat dissipation demands of higher performance servers, and liquid-cooling systems have become increasingly important for thermal management, wherein, the liquid-cooling systems can effectively remove heat through liquid-cooling channels. Moreover, due to the limited space within server cabinets, the configuration of the liquid-cooling channels becomes particularly important. Proper circuit configuration can ensure the heat dissipation performance and avoid the leakage of the liquid-cooling channels, thereby affecting the overall safety of the server cabinets.

Quick connectors are important components in the liquid cooling system. Quick connectors usually comprise a female connector and a male connector. Each quick connector is installed in the server within each server cabinet, and is connected to the main liquid-cooling channel through piping. When the male and female connectors are engaged, the piston cover inside the quick connector is pushed, and the piston cover compresses the spring to make the piston cover move, thereby allowing the liquid to flow. In the prior art, the quick connector employs a waterproof ring installed on the piston cover to prevent liquid leakage. However, in its overall design, the quick connector lacks provisions for tubing alignment. In other word, the quick connector does not have any mechanism to control or stabilize the positions of its internal components, resulting in random movement within a certain range. Because of the lack of tubing alignment, the spring in the female connector rapidly returns to its original state, driving the piston cover back to its position when the male connector of the quick connector is disconnected. However, the piston cover of the quick connector has no support points due to its lack of direct contact with the inner wall of the housing, resulting in the piston cover tilting or rotating as the spring rapidly returns to its original position. Upon the piston cover returning to its position at a tilt angle, a larger gap is formed between the piston cover and the inner wall of the housing, thereby increasing the risk of short circuits caused by liquid leakage and further impacting the equipment in the server room.

Therefore, it is necessary to provide a quick connector to solve the problem of the prior art that causes the piston cover of the quick connector to be prone to tilting during operation, thereby avoiding the risk of liquid leakage within the quick connector.

SUMMARY OF THE INVENTION

Therefore, the present invention provides a quick connector for transporting a liquid. The quick connector comprises a female connector. The female connector comprises a front housing, a piston cover, a piston structure and a first spring. The front housing has a first space and a second space therein, and the first space and the second space are connected with each other. A plurality of slide rails are formed in the first space, and the front housing having a plurality of locking grooves at an opening of the first space. The piston cover is disposed in the first space of the front housing. The outer surface of the piston cover has a plurality of slide blocks to be respectively disposed within the slide rails for allowing the piston cover to slide within the first space. The piston cover has a through hole. The piston structure is disposed in the first space and comprises a piston base, a piston rod, and a piston head connected in sequence. The piston base is disposed at the opening of the first space within the front housing through the locking grooves. The piston head is disposed in the through hole of the piston cover. The first spring is disposed in the first space and its two ends respectively abut against the piston cover and the piston base, and the first spring is sleeved onto the piston rod.

Wherein, the piston base further comprises a plurality of protrusion structures corresponding to the locking grooves, and the piston structure is coupled to the front housing through the protrusion structures and the locking grooves riveted together.

Wherein, the piston base further comprises a plurality of arm structures; one end of each of the arm structures is connected to the piston rod, and the other end of each of the arm structures extends toward the protrusion structures to form a plurality of guiding channel space between the arm structures.

Wherein, each of the locking grooves of the front housing corresponds to each of the slide rails for allowing the locking grooves to be connected to the slide rails, and the width of each of the locking grooves is greater than the cross-sectional width of each of the slide rails.

Wherein, the female connector further comprises a rear housing, and the rear housing is configured to be sleeved onto the front housing toward the opening of the first space of the front housing and configured to abut against the front housing and the piston base; the rear housing has a third space in communication with the first space.

Wherein, the quick connector further comprises a male connector. The male connector is movably connected to the front housing of the female connector. The male connector comprises a fluid inlet hole, and a fixing member, a second spring, and a second piston are sequentially disposed in the fluid inlet hole.

Wherein, when the male connector enters the second space through the opening of the second space of the front housing of the female connector, the male connector abuts against the piston cover and continuously pushes the piston cover toward the piston base, and the piston head abuts against the second piston and continuously pushes the second piston toward the fixing member, so as to make the fluid inlet hole of the male connector, the through hole of the piston cover and the first space of the front housing form a fluid inlet channel.

Wherein, the first spring abuts against the piston cover for allowing the piston cover to move along the slide rails to an initial position in the first space via the slide blocks when the male connector moves away from the piston base.

Wherein, the male connector further comprises a positioning protrusion, and the front housing further comprises a latching element. The latching element is configured to engage with the positioning protrusion of the male connector for allowing the male connector to abut against the piston cover when the male connector continuously pushes the piston cover toward the piston base.

Wherein, the female connector further comprises an outer housing movably sleeved onto the front housing, and the inner side of the outer housing is configured to abut against the latching element.

To summarize, the present invention provides a quick connector. Wherein, the cooperation of the slide blocks within the piston cover and the slide rails of the front housing allows the slide rails of the front housing to provide a stable operating track, thereby enabling the piston cover to move stably in the first space through slide blocks. The piston cover of the female connector can be stably pushed to its original position through the slide blocks when the male connector and the female connector are separated and the first spring returns to its original position. Compared with the prior art, the invention of the quick connector can effectively avoid the piston cover tilting or rotating during movement, thereby preventing leakage caused by the piston cover failing to return to its original position. In addition, the front housing further comprises the locking grooves corresponding to the protrusion structures, enabling the piston base to stably couple to the front housing, so as to improve the female connector stability and prevent components from displacing or detaching during operation.

BRIEF DESCRIPTION OF THE APPENDED DRAWINGS

DETAILED DESCRIPTION OF THE INVENTION

Figure 1:
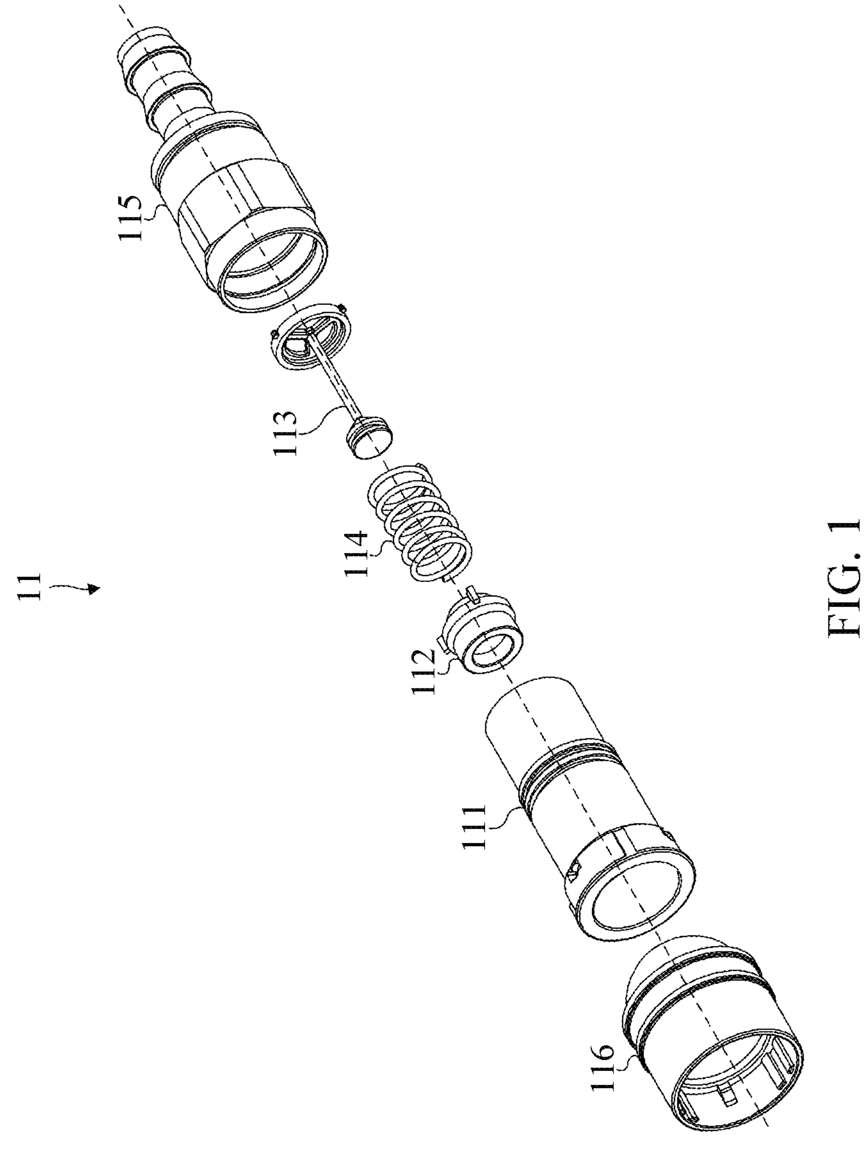
FIG. 1 is an exploded diagram illustrating the female connector of the quick connector according to one embodiment of the present invention.

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments.

Moreover, the devices in the figures are only used to express their corresponding positions and are not drawing according to their actual proportion.

In the description of this specification, the description with reference to the terms "a specific embodiment", "another specific embodiment" or "parts of specific embodiments" etc. means that the specific feature, structure, material or feature described in conjunction with the embodiment include in at least one embodiment of the present invention. In this specification, the schematic representations of the above-mentioned terms do not necessarily refer to the same embodiment. Moreover, the described specific features, structures, materials or characteristics can be combined in any one or more embodiments in a suitable manner.

In the description of the present invention, it is to be understood that the orientations or positional relationships of the terms "longitudinal, lateral, upper, lower, front, rear, left, right, top, bottom, inner, outer" and the like are based on the orientation or positional relationship shown in the drawings. It is merely for the convenience of the description of the present invention and the description of the present invention, and is not intended to indicate or imply that the device or component referred to has a specific orientation, is constructed and operated in a specific orientation, and therefore cannot be understood as limitations of the invention.

Figure 2:
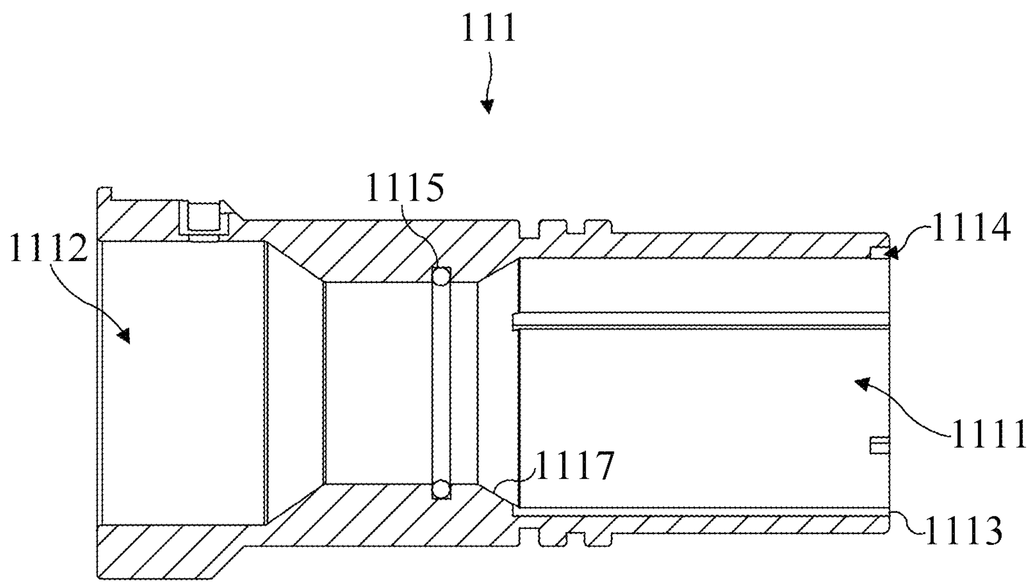
FIG. 2 is a sectional diagram illustrating the front housing of FIG. 1.
Figure 3:
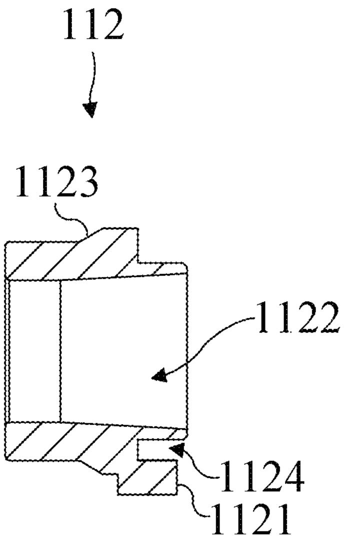
FIG. 3 is a sectional diagram illustrating the piston cover of FIG. 1.
Figure 4:
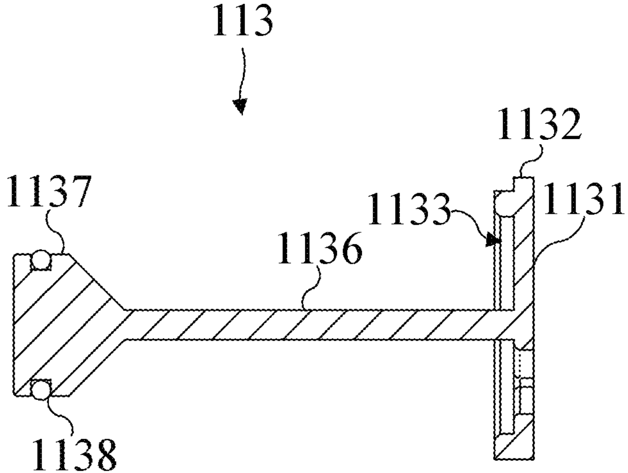
FIG. 4 is a sectional diagram illustrating the piston structure of FIG. 1.

Please refer to FIG. 1 to FIG. 4. FIG. 1 is an exploded diagram illustrating the female connector 11 of the quick connector according to one embodiment of the present invention. FIG. 2 is a sectional diagram illustrating the front housing 111 of FIG. 1. FIG. 3 is a sectional diagram illustrating the piston cover 112 of FIG. 1. FIG. 4 is a sectional diagram illustrating the piston structure 113 of FIG. 1. As shown in FIG. 1 to FIG. 4, the quick connector of the present invention comprises a female connector 11. The female connector 11 comprises a front housing 111, a piston cover 112, a piston structure 113 and a first spring 114. The front housing 111 has a first space 1111 and a second space 1112 therein, and the first space 1111 and the second space 1112 are connected with each other. Wherein, a plurality of slide rails 1113 are formed in the first space 1111, and the front housing 1111 has a plurality of locking grooves 1114 at an opening of the first space. The piston cover 112 can be disposed in the first space 1111 of the front housing 111. The outer surface of the piston cover 112 has a plurality of slide blocks 1121. The slide blocks 1121 are configured to be respectively disposed within the slide rails 1113 for allowing the piston cover 112 to slide within the first space 1111. The piston cover 112 has a through hole 1122. The piston structure 113 can be disposed in the first space 1111, and comprise a piston base 1131, a piston rod 1136, and a piston head 1137 connected in sequence. Wherein, the piston base 1131 is disposed at the opening of the first space 1111 within the front housing 111 through the locking grooves 1114 of the front housing 111. The piston head 1137 can be disposed in the through hole 1122 of the piston cover 112. The first spring 114 is disposed in the first space 1111 and its two ands respectively abut against the piston cover 112 and the piston base 1131. The first spring 114 is sleeved onto the piston rod 1136.

The following provides a detailed description of each component of the female connector. Please refer to FIG. 1 and FIG. 2. As shown in FIG. 1 and FIG. 2, in this embodiment, the front housing 111 of the female connector within the quick connector is formed as a hollow cylindrical structure. As shown in FIG. 2, the front housing 111 has two major interior space (namely, the first space 1111 and the second space 1112), and the first space 1111 and the second space 1112 are connected with each other. In practice, the first space 1111 is configured to accommodate the piston cover 112 and the piston structure 113; the second space 1112 is configured to accommodate the male connector. It should be noted that the slide rails 1113 are formed in the first space 1111, and the slide rails 1113 are configured to guide the piston cover 112 to move, so that the piston cover 112 can be stably moved in the front housing 111. The front housing 111 further comprises a first limiting structure 1117, the plurality of locking grooves 1114 and a seal ring 1115. The first limiting structure 1117 can be further configured to limit the position of the piston cover 112 within the front housing 111.

Subsequently, please refer to FIG. 1 and FIG. 3. As shown in FIG. 1 and FIG. 3, in this embodiment, the piston cover 112 of the female connector within the quick connector has the through hole 1122, a first positioning protrusion 1123, a first groove 1124, and a plurality of slide blocks 1121. The first positioning protrusion 1123 is sleeved onto the piston cover 112, and the angle of inclination of the first positioning protrusion 1123 is equal to the angle of inclination of the first limiting structure 1117 within the front housing 111. The first positioning protrusion 1123 is configured to limit the position of the piston cover 112. The first groove 1124 is disposed on an opening of the piston cover 112 and configured to accommodate the first spring 114. The slide blocks 1121 can also be disposed on the same side of the first groove 1124. The protrusion of the slide blocks 1121 can be disposed in the slide rails 1113 of the front housing 111, so as to allow the piston cover 112 to move in the first space 1111 of the front housing 111.

Then, please refer to FIG. 1 and FIG. 4. As shown in FIG. 1 and FIG. 4, in this embodiment, the piston structure 113 of the female connector within the quick connector comprises a piston head 1137, a piston rod 1136 and a piston base 1131. The piston head 1137 is formed as a cylinder. The seal ring 1138 is sleeved onto the piston head 1137. Wherein, one end of the piston head 1137 is connected to the piston rod 1136 and the connection between the piston head 1137 and the piston rod 1136 is conical (namely, the diameter is getting smaller and smaller), reducing the resistance during the flow of liquid. The piston rod 1136 is connected to the piston head 1137 and the piston base 1131, and is formed as an elongate round rod along its entire length. The piston base 1131 is formed as a disc-like structure. The piston base 1131 further comprises a plurality of protrusion structures 1132 and a second groove 1133. The protrusion structures 1132 is disposed on the piston base 1131 in correspondence with the locking grooves 114 of the front housing 111, resulting in the piston structure 113 fixing in the front housing 111 through the protrusion structure 1132 of the piston base 1131. In practice, the piston structure 113 can be integrally formed from the piston head 1137, the piston rod 1136 and the piston base 1131.

Please refer to FIG. 1 and FIG. 4. In practice, the assembly process of the female connector 11 comprises the following steps. First, the piston cover 112 is disposed in the first space 1111 of the front housing 111 from the opening of the first space 1111; the piston cover 112 can move along the slide rails 1113 from the first space 1111 to the middle of the interior side of the front housing 111 through the slide blocks 1121. The piston structure 1121 and the slide rails 1113 can ensure that the piston cover 112 stably moves in the first space 1111. At this time, the piston cover 112 can further limit the position of the piston cover 112 within the front housing through the first limiting structure 1117 of the front housing 111. Then, the first spring 114 and the piston structure 113 can be sequentially disposed in the front housing 111. One side of the first spring 114 can be stably disposed in the first groove 1124 of the piston cover 112. The other side of the first spring 114 is disposed on the second groove 1133 of the piston base 1131 within the piston structure 113, so as to allow the first spring 114 to be stably pushed and to provide elastic force in the first space 1111.

The protrusion structures 1132 of the protrusion structure 113 can correspond to the locking grooves 1114 of the front housing 111 to fix when the piston structure 113 is disposed in the front housing 111. The first spring 114 can generate an elastic thrust to force the piston cover 112 to move toward the second space 1112 of the front housing 111 when the piston base 1131 of the piston structure 113 engages with the front housing 111. In this case, the first limiting structure 1117 of the front housing 111 and the first positioning protrusion 1123 of the piston cover 112 have the protrusion with the same angle of inclination. Therefore, the first limiting structure 1117 of the front housing 111 can effectively limit the movement of the piston cover 112 to ensure that the piston cover 112 only moves in the first space 1111 when the first spring 114 pushes the piston cover 112. At the same time, the seal ring 1115 of the front housing 111 can be disposed between the piston cover 112 and the interior side of the front housing 111 to avoid liquid leakage.

Figure 5:
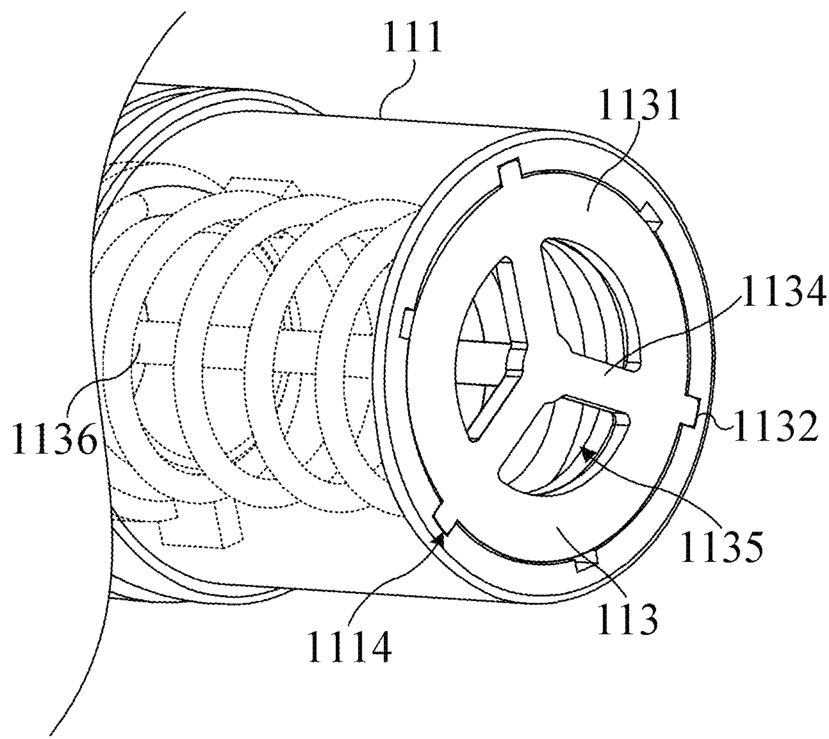
FIG. 5 is a partially enlarged schematic diagram illustrating the front housing and the piston structure of FIG. 1 from another perspective.

Please refer to FIG. 1 and FIG. 5. FIG. 5 is a partially enlarged schematic diagram illustrating the front housing 111 and the piston structure 113 of FIG. 1 from another perspective. As shown in FIG. 1 and FIG. 5, the protrusion structures 1132 of the piston base 1131 and the locking grooves 1114 of the front housing 111 can be riveted together when the piston base 1131 of the piston structure 113 engages with the front housing 111, thereby effectively fixing the position of the piston structure 113. In this way, in this embodiment, the quick connector not only ensures the stability of the whole structure, but also avoids the piston structure 113 falling away during operation. Furthermore, as shown in FIG. 5, the piston base 1131 further comprises a plurality of arm structures 1134. One end of each of the arm structures 1134 is connected to the piston rod 1136, and the other end of each of the arm structures 1134 extends toward the protrusion structures 1132 to form a plurality of guiding channel spaces 1135 between the arm structures 1134. The guiding channel spaces 1135 are configured to allow liquid to flow.

Thereafter, please refer to FIG. 1 to FIG. 5. Furthermore, the female connector 11 further comprises a rear housing 115. The rear housing 115 is sleeved onto the front housing 111 toward the opening of the first space 1111 of the front housing 111. The rear housing 115 is configured to abut against the front housing 111 and the piston base 1131. In practice, the third space (not shown in the figure) of the rear housing 115 is connected to the first space 1111 of the front housing 111. Liquid can flow into the third space from the first space 1111 via guiding channel space 1135. In practice, in this embodiment, the number of the slide blocks 1121 of the piston cover 112 is three. The number of the protrusion structures 1132 of the piston base 1131 within the piston structure 113 is three. The number of the slide rails 1113 of the front housing 111 and the number of the locking grooves 1114 are three, but the number of the aforementioned components is not limited to this. In addition, the positions of the locking grooves at the opening of the front housing are not limited to these. In another embodiment, each of the locking grooves corresponds to each of the slide rails, and each of the locking grooves is connected to the slide rails. Wherein, the width of each of the locking grooves is greater than the cross-sectional width of each of the slide rails for allowing the piston base to be stably disposed at the opening of the front housing.

In summary, the slide rails of the front housing in the present invention provide a stable operating track to enable the piston cover to move in the first space through the slide blocks. Compared with the prior art, the present invention can effectively prevent the piston cover from tilting or rotating during movement. Moreover, the front housing further has the locking grooves engaging with the protrusion structures to enable the piston base to be coupled to the front housing, thereby improving the stability of the whole female connector and avoiding the displacement or detachment of the component during operation.

Figure 6:
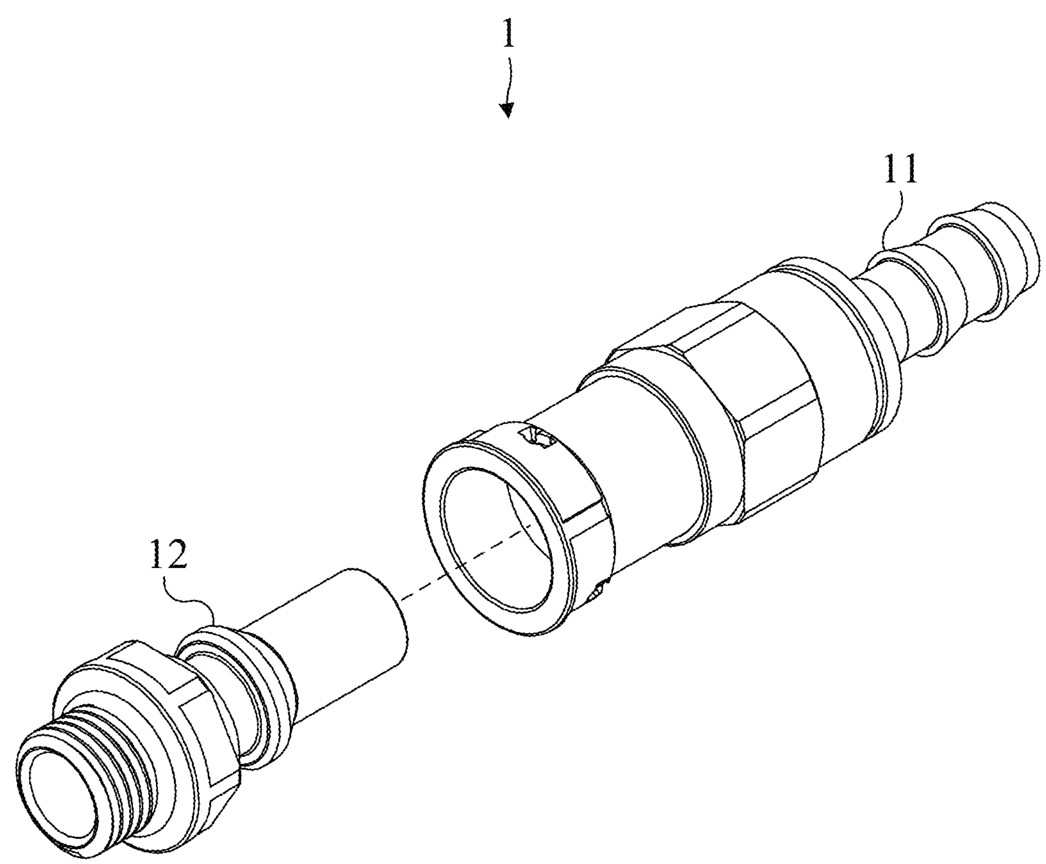
FIG. 6 is a schematic structural diagram illustrating the female connector and the male connector of the quick connector before connection according to one embodiment of the present invention.
Figure 7:
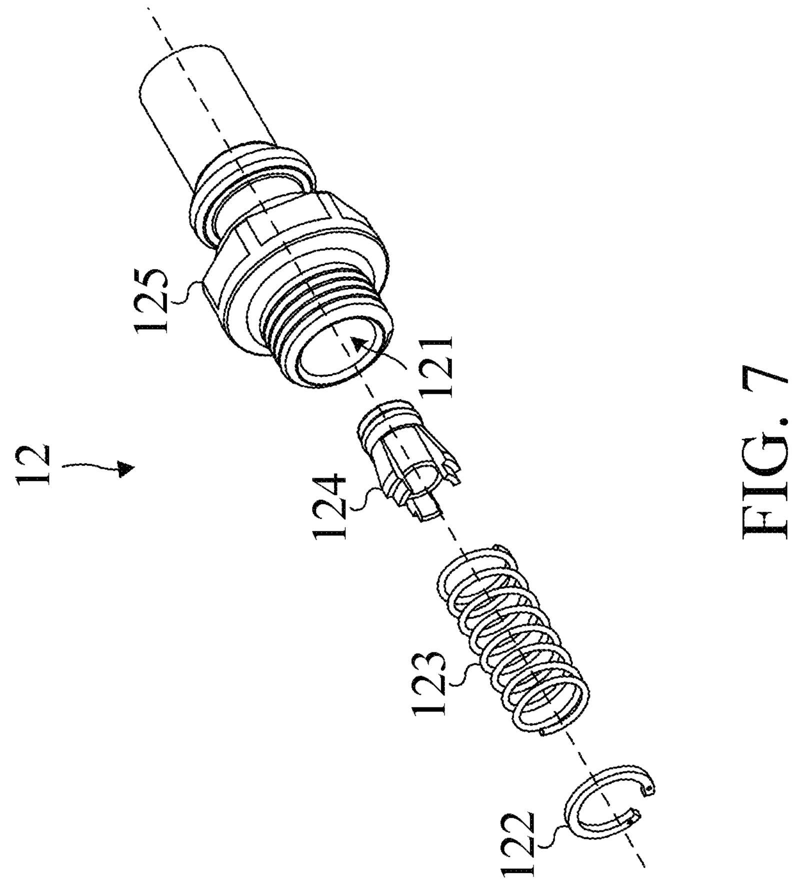
FIG. 7 is an exploded diagram illustrating the male connector of FIG. 6.

Subsequently, please refer to FIG. 6 and FIG. 7. FIG. 6 is a schematic structural diagram illustrating the female connector 11 and the male connector 12 of the quick connector 1 before connection according to one embodiment of the present invention. FIG. 7 is an exploded diagram illustrating the male connector 12 of FIG. 6. As shown in FIG. 6 and FIG. 7, in this embodiment, the quick connector 1 can further comprise a male connector 12 engaging with the female connector 11, and the male connector 12 can movably engage with the female connector 11 within the front housing 111. As shown in FIG. 7, in this embodiment, the male connector 12 of the quick connector 1 comprises a fluid inlet hole 121. Wherein, a fixing member 122, a second spring 123, and a second piston 124 are sequentially disposed in the fluid inlet hole 121.

Figure 8:
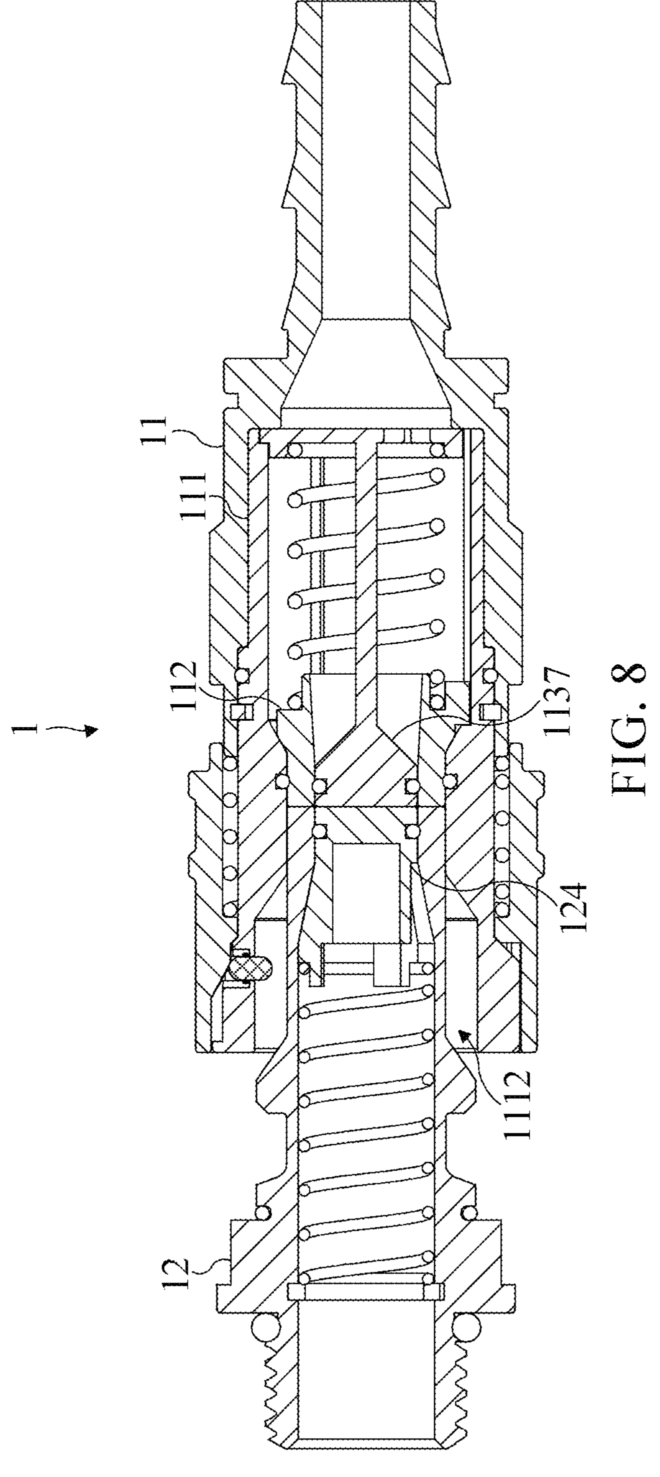
FIG. 8 is a sectional diagram illustrating the quick connector after connection according to one embodiment of the present invention.
Figure 9:
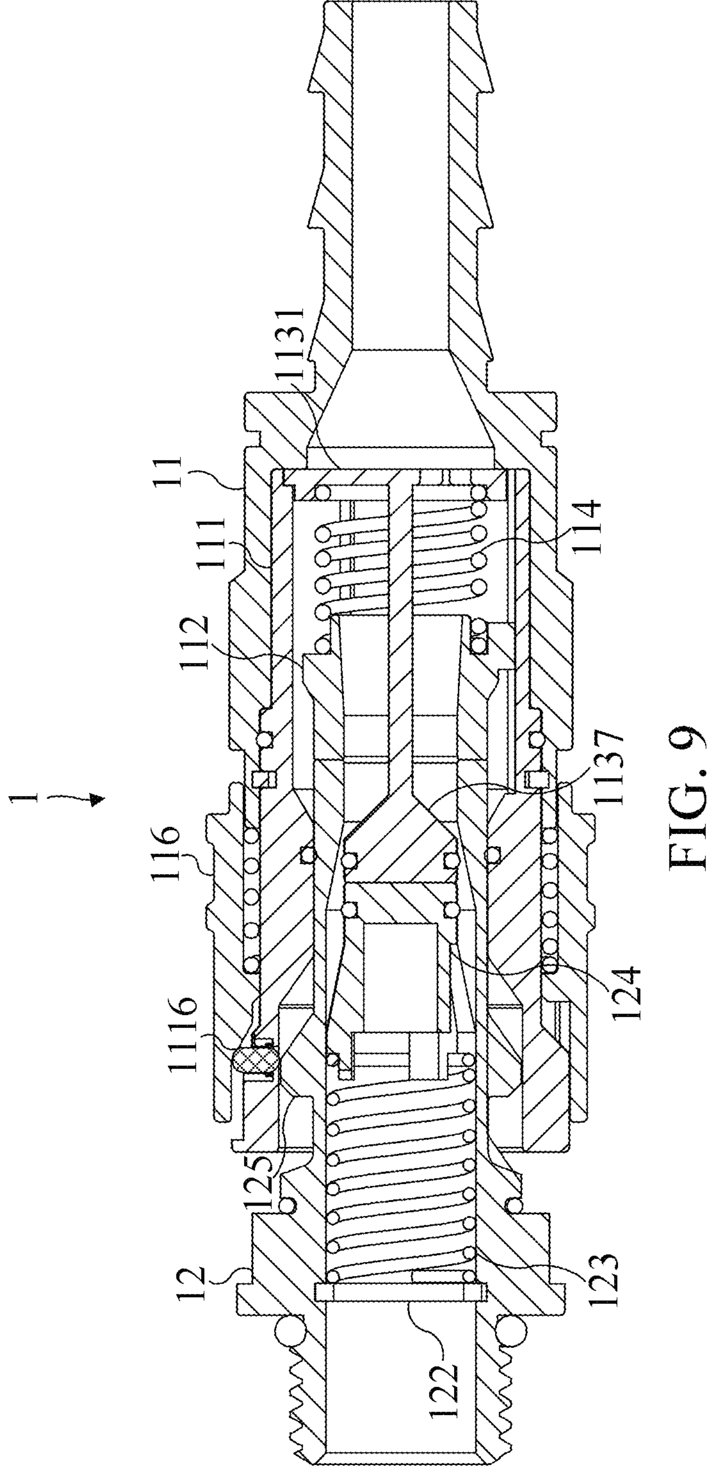
FIG. 9 is a sectional diagram illustrating the male connector of the quick connector pushed toward the piston base after connection according to one embodiment of the present invention.
Figure 10:
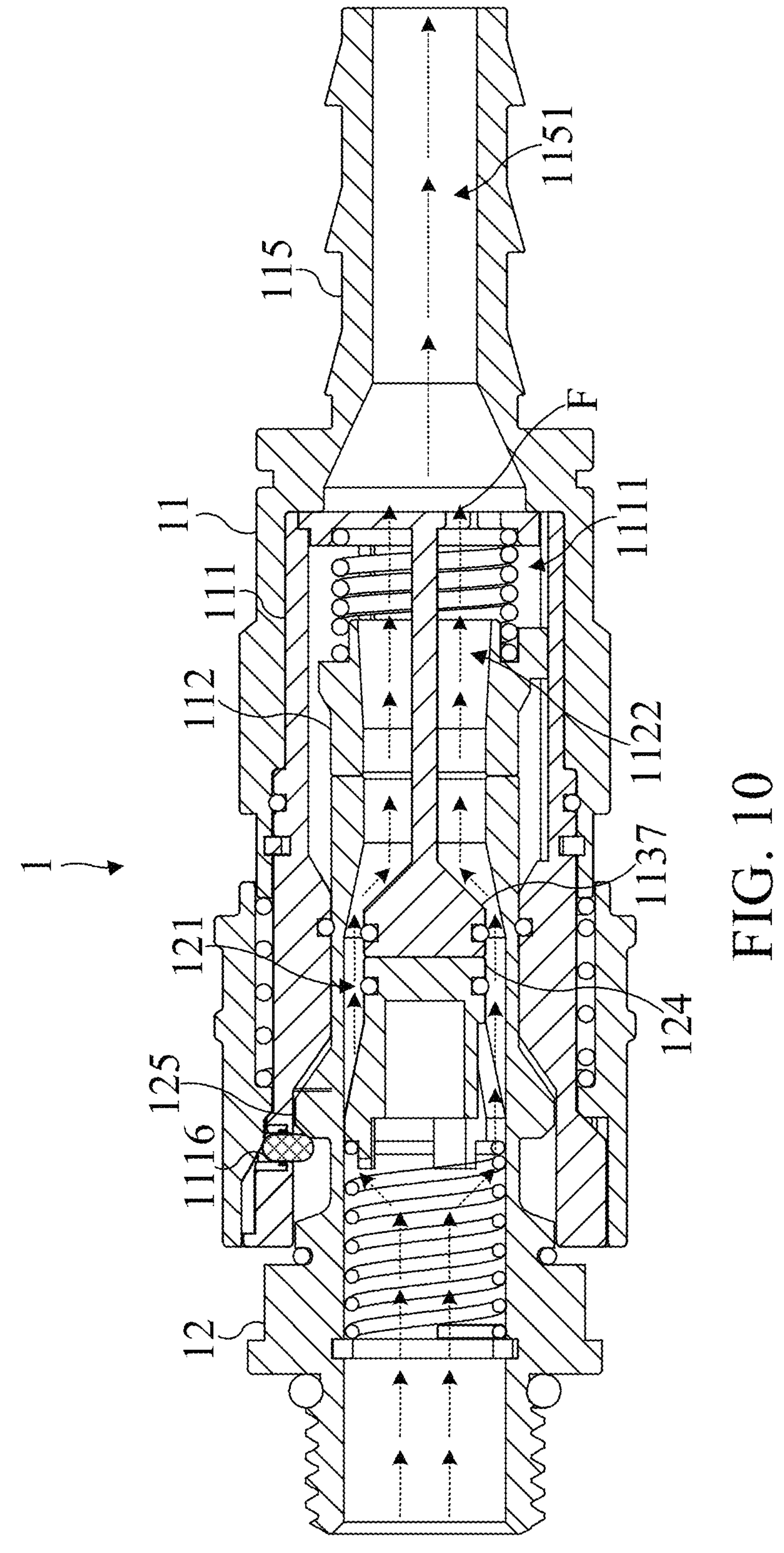
FIG. 10 is a sectional diagram illustrating the male connector engaging with the female connector according to one embodiment of the present invention.

Then, in practical applications, please refer to FIG. 1, FIG. 7, FIG. 8, FIG. 9 and FIG. 10. FIG. 8 is a sectional diagram illustrating the quick connector 1 after connection according to one embodiment of the present invention. FIG. 9 is a sectional diagram illustrating the male connector 12 of the quick connector 1 pushed toward the piston base 1131 according to one embodiment of the present invention. FIG. 10 is a sectional diagram illustrating the male connector 12 engaging with the female connector 11 according to one embodiment of the present invention. In this embodiment, the male connector 12 and the female connector 11 are preliminarily coupled with each other when the male connector 12 enters the second space 1112 through the opening of the second space 1112 of the front housing 111 of the female connector 11. As shown in FIG. 8, the male connector 12 is in contact with the piston cover 112 of the female connector 11 at that time; the second piston 124 of the male connector 12 is in contact with the piston head 1137 of the female connector 11.

Furthermore, please refer to FIG. 1, FIG. 7 and FIG. 9. As shown in FIG. 1, FIG. 7 and FIG. 9, in this embodiment, the front housing 111 of the female connector 11 of the quick connector 1 further comprises a latching element 1116. The latching element 1116 is configured to fix the position of the male connector 12 for allowing the liquid to flow through both the female connector 11 and the male connector 12. The female connector 11 further comprises an outer housing 116, and the outer housing 116 can be movably sleeved onto the front housing 111. The outer housing 116 can be configured to abut against the latching element 1116 to limit the direction of the movement of the latching element 1116, and to avoid the latching element 1116 detaching. The male connector 12 comprises a positioning protrusion 125. The positioning protrusion 125 has an inclined surface for allowing the latching element 1116 of the front housing 111 to move along the inclined surface, thereby limiting the movement of the latching element 1116. As shown in FIG. 9, in practice, the male connector 12 can continuously push the piston cover 112, and the piston cover 112 can push the first spring 114, causing it to be compressed when the male connector 12 is continuously pushed toward the piston base 1131. At the same time, the piston head 1137 of the front connector 11 can continuously abut against the second piston 124 toward the direction of the fixing member 122 of the male connector 12, causing the second spring 123 to be compressed. In other words, the male connector 12 can only push the piston cover 112 of the female connector 11 while it is continuously pushed toward the female connector 11. The piston cover 112 can move along the slide rails 1113 in the first space through the slide blocks 1121 while the male connector 12 pushes it. Then, the latching element 1116 of the front housing 111 can contact the inclined surface of the positioning protrusion 125 of the male connector 12 when the male connector 12 is pushed toward the piston base 1131. Furthermore, as the male connector 12 is continuously pushed, the latching element 1116 of the front housing 111 can be pushed up by the inclined surface of the positioning protrusion 125 of the male connector 12, driving the movement of the outer housing 116.

Then, as shown in FIG. 10, the latching element 1116 of the front housing 111 within the front connector 11 can further engage with the positioning protrusion 125 of the male connector 12 to limit the movement of the male connector 12 when the male connector 12 is continuously pushed. At this time, the piston head 1137 and the second piston 124 can be correspondingly disposed in the fluid inlet hole 121 of the male connector 12. The diameter from the piston head 1137 and the front end of the second piston 124 are less than the diameter from the fluid inlet hole 121 of the male connector 12. Therefore, the space formed among the piston head 1137, the second head 124, and the fluid inlet hole 121 allows liquid to flow. As shown in FIG. 10, the fluid inlet hole 121 of the male connector 12, the through hole 1122 of the piston cover 112, the first space 1111 of the front housing 111 and the third space 1151 of the rear housing 115 within the female connector 11 form a fluid inlet channel F. Thus, Liquid can flow from the fluid inlet hole 121 of the male connector 12, pass along the second space 124, then enter the through hole 1122 of the piston cover 112, flow into the first space 1111 of the front housing 111, and finally into the third space of the rear housing 115.

Furthermore, in the practical applications, a user can move the outer housing of the female connector to push up the latching element of the front housing when the user wants to pull out the male connector from the female connector. Then, the male connector is pulled out of the female connector to separate them. Simultaneously, the first spring returns to its original position and pushes the piston cover, allowing the piston cover to return to its original position along the slide rails of the front housing through the slide blocks.

To summarize, the present invention provides a quick connector.

Wherein, the cooperation of the slide blocks within the piston cover and the slide rails of the front housing allows the slide rails of the front housing to provide a stable operating track, thereby enabling the piston cover to move stably in the first space through slide blocks. The piston cover of the female connector can be stably pushed to its original position through the slide blocks when the male connector and the female connector are separated and the first spring returns to its original position. Compared with the prior art, the invention of the quick connector can effectively avoid the piston cover tilting or rotating during movement, thereby preventing leakage caused by the piston cover failing to return to its original position. In addition, the front housing further comprises the locking grooves corresponding to the protrusion structures, enabling the piston base to stably couple to the front housing, so as to improve the female connector stability and prevent components from displacing or detaching during operation.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A quick connector for transporting a liquid, comprising:

a female connector, comprising:

- a front housing having a first space and a second space therein, the first space and the second space being connected with each other, a plurality of slide rails being formed in the first space, and the front housing having a plurality of locking grooves at an opening of the first space;
- a piston cover disposed in the first space of the front housing, the outer surface of the piston cover having a plurality of slide blocks to be respectively disposed within the slide rails for allowing the piston cover to slide within the first space, the piston cover having a through hole;
- a piston structure disposed in the first space and comprising a piston base, a piston rod, and a piston head connected in sequence, the piston base being disposed at the opening of the first space within the front housing through the locking grooves, the piston head being disposed in the through hole of the piston cover; and
- a first spring disposed in the first space and its two ends respectively abutting against the piston cover and the piston base, and the first spring being sleeved onto the piston rod.

2. The quick connector of claim 1, wherein the piston base further comprises a plurality of protrusion structures corresponding to the locking grooves, and the piston structure is coupled to the front housing through the protrusion structures and the locking grooves riveted together.

3. The quick connector of claim 2, wherein the piston base further comprises a plurality of arm structures, one end of each of the arm structures is connected to the piston rod, and the other end of each of the arm structures extends toward the protrusion structures to form a plurality of guiding channel spaces between the arm structures.

4. The quick connector of claim 1, wherein each of the locking grooves of the front housing corresponds to each of the slide rails for allowing the locking grooves to be connected to the slide rails, and the width of each of the locking grooves is greater than the cross-sectional width of each of the slide rails.

5. The quick connector of claim 1, wherein the female connector further comprises a rear housing, the rear housing is configured to be sleeved onto the front housing toward the opening of the first space of the front housing and configured to abut against the front housing and the piston base, the rear housing has a third space in communication with the first space.

6. The quick connector of claim 1, further comprising a male connector, the male connector being movably connected to the front housing of the female connector, the male connector comprising a fluid inlet hole, and a fixing member, a second spring, and a second piston being sequentially disposed in the fluid inlet hole.

7. The quick connector of claim 6, wherein when the male connector enters the second space through the opening of the second space of the front housing of the female connector, the male connector abuts against the piston cover and continuously pushes the piston cover toward the piston base, and the piston head abuts against the second piston and continuously pushes the second piston toward the fixing member, so as to make the fluid inlet hole of the male connector, the through hole of the piston cover and the first space of the front housing form a fluid inlet channel.

8. The quick connector of claim 6, wherein the first spring abuts against the piston cover for allowing the piston cover to move along the slide rails to an initial position in the first space via the slide blocks when the male connector moves away from the piston base.

9. The quick connector of claim 6, wherein the male connector further comprises a positioning protrusion, and the front housing further comprises a latching element, the latching element is configured to engage with the positioning protrusion of the male connector for allowing the male connector to abut against the piston cover when the male connector continuously pushes the piston cover toward the piston base.

10. The quick connector of claim 9, wherein the female connector further comprises an outer housing movably sleeved onto the front housing, the inner side of the outer housing is configured to abut against the latching element.

* * * * *